(12) United States Patent
Hagen

(10) Patent No.: US 7,440,495 B1
(45) Date of Patent: Oct. 21, 2008

(54) FPGA HAVING AC COUPLING ON I/O PINS WITH AN EFFECTIVE BYPASS OF THE AC COUPLING

(75) Inventor: Timothy P. Hagen, Maple Grove, MN (US)

(73) Assignee: Xilinx, Inc., San Jose, CA (US)

( * ) Notice: Subject to any disclaimer, the term of this patent is extended or adjusted under 35 U.S.C. 154(b) by 624 days.

(21) Appl. No.: 11/076,648

(22) Filed: Mar. 10, 2005

(51) Int. Cl.
*H04L 5/16* (2006.01)
(52) U.S. Cl. .................. 375/219; 375/257; 375/316
(58) Field of Classification Search .............. 375/219, 375/220, 222, 257, 258, 316, 324, 326, 340, 375/346, 350
See application file for complete search history.

(56) References Cited

U.S. PATENT DOCUMENTS

| 4,852,123 A | * | 7/1989 | Bickley et al. | 375/223 |
| 5,339,040 A | * | 8/1994 | Loper | 329/358 |
| 6,442,380 B1 | * | 8/2002 | Mohindra | 455/234.1 |
| 6,856,788 B2 | * | 2/2005 | Chang et al. | 455/41.1 |
| 7,280,590 B1 | * | 10/2007 | Boecker et al. | 375/219 |
| 2007/0298729 A1 | * | 12/2007 | Kappes | |

* cited by examiner

*Primary Examiner*—Dac V Ha
(74) *Attorney, Agent, or Firm*—Thomas A. Ward; Michael T. Wallace

(57) ABSTRACT

DC balance is obtained in an integrated circuit (IC) having I/O pins with AC coupling by effectively bypassing the AC coupling. The DC balance is accomplished by mixing in a known, low frequency mix signal or carrier in a circuit external to the IC and then digitally canceling out that mix signal inside the IC fabric. The mixer or modulating circuitry external to the IC can be a simple XOR gate. With the IC being an FPGA, the logic internal to the FPGA can be programmed to form the demultiplexing circuitry to digitally cancel out the mix signal, as well as to provide a carrier signal to the external mixer. To minimize errors due to data signal transitions near the edge of the carrier signal, a cleaner circuit is used to eliminate transitioning bits on either side of a carrier signal edge. With modulation used, synchronization circuitry is likewise included to provide synchronization during startup as well as after long dead times in the data signal.

18 Claims, 4 Drawing Sheets

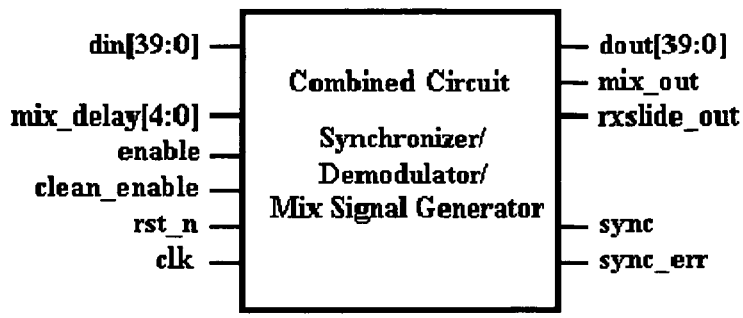

FIG. 6

| Port Description for Synchronizer/Modulator | | |
|---|---|---|
| Port name | Type | Description |
| clean enable | Input | Cleaner -eliminates error around mix signal edges |
| clk | Input | Clock |
| din[39:0] | Input | Input parallel data from MGT |
| dout[39:0] | Output | Output data |
| enable | Input | Enable |
| mix_delay[4:0] | Input | Sets period of mix signal |
| mix_out | Output | Mix signal |
| rst_n | Input | Reset |
| rxslide_out | Output | Synchronization signal |
| sync | Output | Indicates synchronization is successful |
| sync_err | Output | Indicates synchronization error |

FIG. 7

FPGA HAVING AC COUPLING ON I/O PINS WITH AN EFFECTIVE BYPASS OF THE AC COUPLING

BACKGROUND

1. Technical Field

The present invention relates to integrated circuits (ICs) with AC coupling on the I/O pins, where DC balance is desired for at least some data signals provided to the I/O pins. More particularly, the present invention relates to providing a bypass to the AC coupling to enable DC balance of an input data signal.

2. Related Art

AC-coupling is desirable for a number of reasons—(1) To change the DC bias level when interconnecting logic families with different switching thresholds; (2) To provide a removable interface that may be shorted to ground without damaging the output drivers; or (3) When combined with differential signaling and transformer coupling, to connect boxes without requiring any DC connection between the two product chassis.

AC coupling is typically accomplished using a high-pass filter placed in series with a transmission line. A series-connected DC-blocking capacitor is a good example of a commonly used high-pass filter. The DC-blocking capacitor strips away all low-frequency content in the signal. If a signal has good DC balance, it is possible to pass it through a suitable high-pass filter without altering the informational content. If the signal is not DC balanced, AC coupling is typically undesirable.

For a signal to be DC balanced, one property of the signal is that it has a substantially equal numbers of ones and zeros. The DC balanced signal will have a median voltage level fixed, typically at zero volts. A DC offset can be created by a significantly unequal number of ones and zeros. The DC offset can also be created with a long dead time in a signal stream allowing charge to build up on the transmission line carrying the signal.

Because only AC signals that have good DC balance are anticipated as input signals, some IC manufacturers have included AC coupling on the I/O pins. One example of an IC with AC coupling capacitors placed in the chips connected to its I/O pins is the Virtex-II PRO X FPGA manufactured by Xilinx, Inc. of San Jose, Calif.

A new problem has therefore been created when devices with integrated AC coupling capacitors on I/O pins are targeted for applications that do not meet DC balance/run length criteria, or for input signals with unknown characteristics. For example, the Virtex-II Pro X FPGA uses Multi-Gigabit Transceivers (MGTs) as high speed over-sampling and/or digitizing engines for input data streams. For some input data streams long dead periods, or completely unknown DC characteristics creating bad DC balance, so some form of DC coupling is needed at the input of the MGTs to provide DC balance correction for error free data to be received. AC coupling is, thus, undesirable for such input data streams.

For applications using ICs with integrated AC coupling capacitors, a method for defeating the AC coupling is thus desirable in order to simulate an interface with DC coupling characteristics. One solution is for manufacturers to provide a switch to bypass the AC coupling capacitor when signals are expected where AC coupling is undesirable. However, if the manufacturer does not provide bypass switches it is desirable to provide an alternative approach to bypass or defeat the AC coupling.

SUMMARY

In accordance with embodiments of the present invention, an effective bypass of AC coupled I/O pins in an IC is used to provide good DC balance, even with an unbalanced or unknown input data signal.

Embodiments of the present invention are accomplished by mixing in a known, low frequency mix signal or carrier in a circuit external to the IC and then digitally canceling out that mix signal inside the IC. In one embodiment, the mixer or modulating circuitry external to the IC is an XOR gate with one input receiving the data signal and another receiving the mix signal from the IC.

With the IC being an FPGA, the logic internal to the FPGA can be programmed or configured to form the demultiplexing circuitry to digitally remove the mix signal. Circuitry internal to the FPGA can likewise be programmed to generate the mix signal and provide it to the external mixer. Because logic of the FPGA is programmable to form the demultiplexer and provide the carrier signal, even without a dedicated bypass of the AC signal on the FPGA I/O pins, an effective bypass is created.

When an input data signal transitions at or near the same time as the carrier signal transition, an error can occur. In one embodiment to compensate for the error a cleaner circuit is included in the IC. The cleaner circuit functions to remove any bits resulting from a transition of the data signal occurring near the edge of the carrier signal. The cleaner circuit functions to eliminate bits on either side of the transition of the carrier signal.

Because mixing is used, in one embodiment, synchronization components are included in the IC. The synchronization circuitry functions to align the carrier provided to the modulator and demodulator. The synchronization process is provided upon startup, and optionally after a significant dead time in the input data signal or after an unusually long sustained data signal.

BRIEF DESCRIPTION OF THE DRAWINGS

Further details of the present invention are explained with the help of the attached drawings in which:

FIG. 6 illustrates inputs and outputs from an example of a circuit forming a combined synchronizer, demodulator, and carrier signal generator from the FPGA of FIG. 1; and FIG. 7 provides a list describing the function of each input and output of the circuit of FIG. 6.

DETAILED DESCRIPTION

Figure 1:
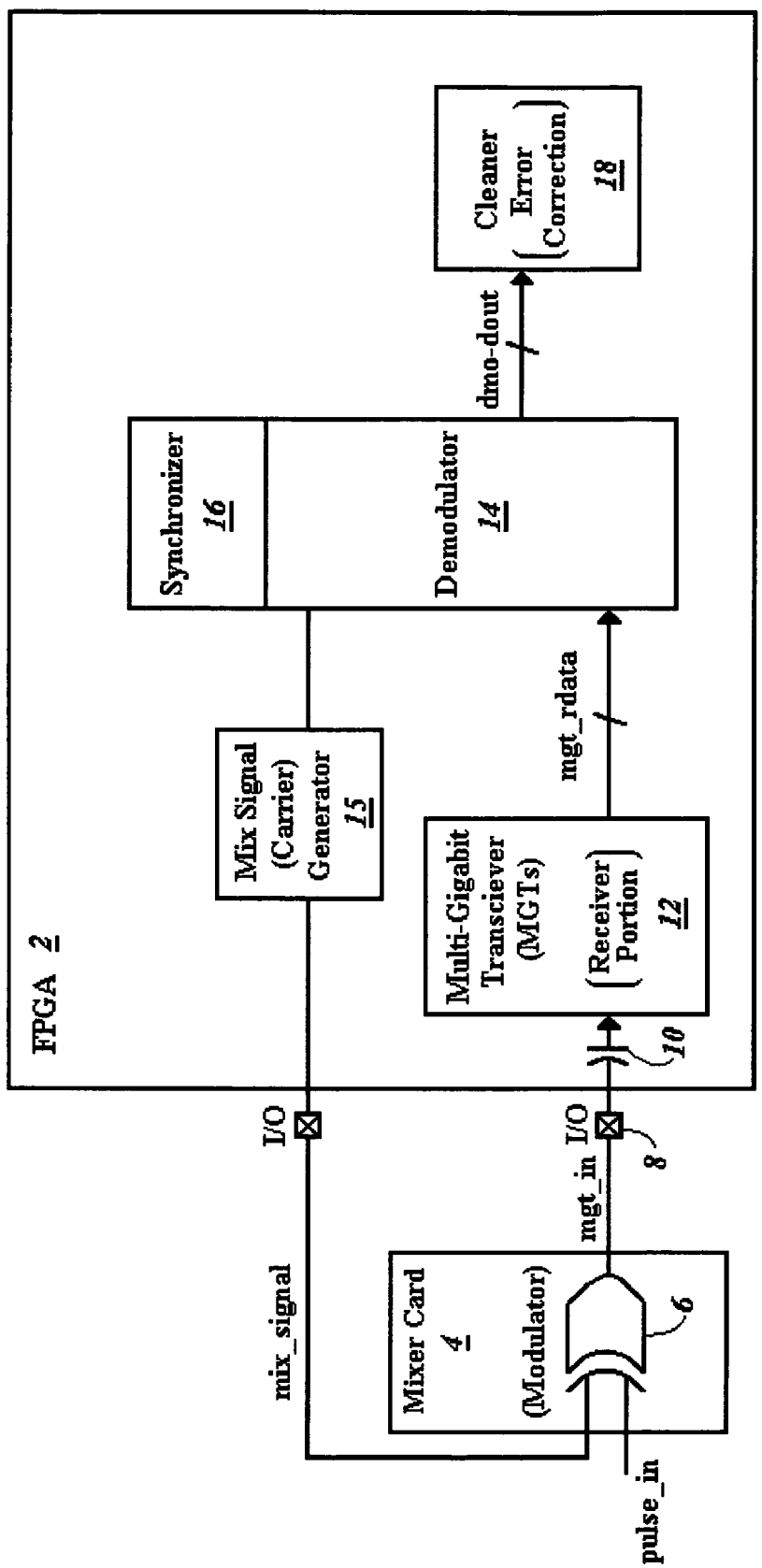
FIG. 1 illustrates a system for providing an effective bypass of AC coupling of an integrated circuit (IC) according to embodiments of the present invention.

FIG. 1 illustrates a system for providing an effective bypass of AC coupling on I/O pins of an integrated circuit (IC) according to embodiments of the present invention. The IC used in the system of FIG. 1 is illustrated as a FPGA 2, although other IC types can be used. The FPGA 2 or other components containing programmable logic, such as a complex programmable logic device (CPLD), offer the advantage of logic that is programmable to form the circuitry shown in the FPGA 2 of FIG. 1. As an alternative to an IC with programmable logic, the IC can be an application specific integrated circuit (ASIC) having fixed components as shown in the FPGA 2 of FIG. 1.

In addition to the FPGA 2, the system of FIG. 1 includes a mixer card 4 with an exclusive OR (XOR) gate 6 providing a modulator for one I/O port 8 of the FPGA 2. Although not shown, the mixer card 4 can include an XOR gate for each I/O port with AC coupling where an effective bypass of the AC coupling is desired. Although the mixer card 4 is shown with an XOR gate 6 used as a modulator, other modulator circuitry may be used depending on design requirements.

The FPGA 2 shown has internal AC coupling provided by a DC blocking capacitor 10 in series with a trace provided from the I/O port 8. The blocking capacitor 10 is followed by a MGT receiver 12 that receives input signals from the I/O 8 and converts the signal data to provide parallel data to internal parts of the FPGA 2. The output of the MGT 12 is provided through the demodulator 14 to internal parts of the FPGA 2. Although illustrated with a MGT provided on the input, it is understood that a simple I/O buffer or other type transceiver might be used in the IC. Similarly, another type high pass filter than the blocking capacitor 10 can be included for which effective AC bypass can be provided by embodiments of the present invention. An example of FPGA 2 that can be used to implement an embodiment of the invention is the Virtex II Pro X FPGA product from Xilinx, Inc. of San Jose, Calif.

The mix signal generator 15 provides the mix_signal, or carrier, to the mixer card 4, as well as to the demodulator 14. The mix signal can be a clock signal of the FPGA 2, or other signal generated by dividing down the FPGA clock signal. The demodulator 14 in one embodiment includes digital logic to effectively cancel out the transitions of the mix signal from the modulated signal to recreate the data input signal received at the input of modulator 6.

Figure 2:
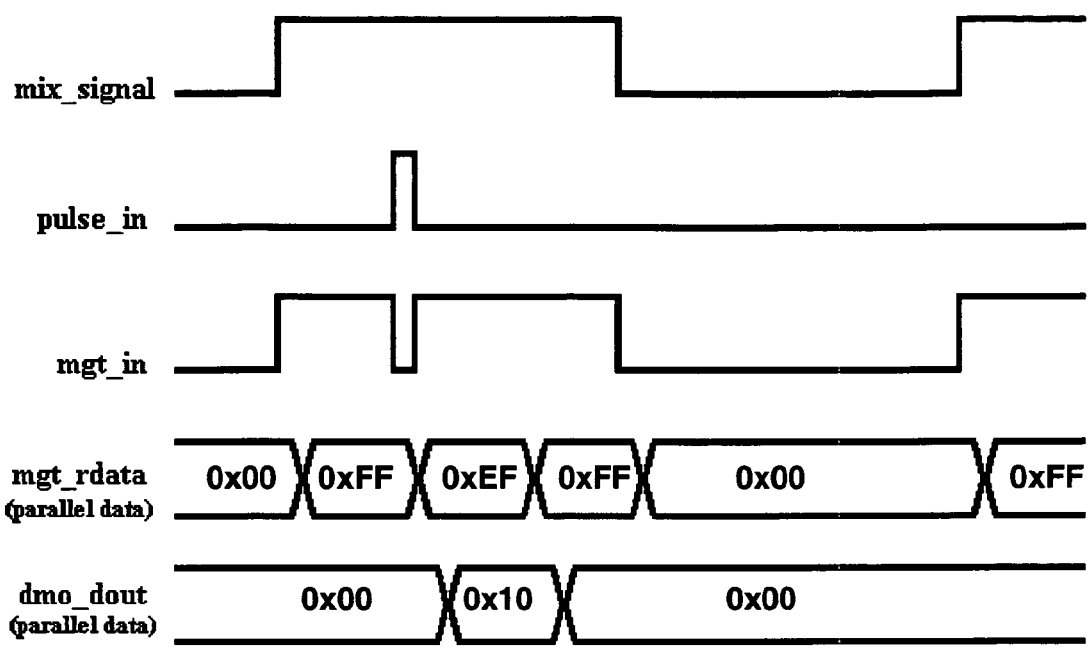
FIG. 2 provides a timing diagram illustrating operation of the components of FIG. 1.

FIG. 2 provides a timing diagram illustrating operation of the components of FIG. 1. The mix_signal is the low frequency mix generated by the mix signal generator 15. It is combined with the data input signal pulse_in using the XOR gate modulator 6. The resulting signal mgt_in from modulator 6 has good enough DC balance and high enough frequency content to be properly received by MGT 12 even in an AC coupled mode. The output of MGT 12 produces the mgt_r-data signal where the combined mix/input signal can be seen converted to a parallel differential signal. Note that although parallel data is shown to illustrate the typical output of a MGT, conversion to parallel is not essential. The mix signal is digitally removed in demodulator 14 and the resulting parallel data output signal dmo_dout contains a digitized version of the input data signal.

The carrier mix signal functions to keep the AC coupling charged and therefore provides good DC balance even when sampling of a signal with bad DC balance, or unknown characteristics. Selection of the mix signal frequency is typically not essential to operation of embodiments of the present invention. To avoid excessive charge up or discharge of the coupling capacitor 10, the mix signal frequency can be selected high enough to prevent a DC offset from charging up the capacitor based on the size of capacitor 10. To avoid errors due to the data signal pulse_in interfering with the mix_signal carrier, the carrier is preferably selected to be significantly lower in frequency than the data signal. Picking a mix signal with a period longer than the maximum active run length of the input data signal pulse_in should provide good results.

If the input data signal pulse_in is completely unknown or could have a period close to the chosen mix signal frequency, there is an end case that would cause errors. If the input data signal closely matches the mix signal for any significant length of time, the mixed signal mgt_in provided to the MGT 12 will have unacceptable DC balance, or disappear altogether in the case of a perfect match. In this case, a mix signal with a random component can be used.

Because of delay introduced by components between the modulator and the demodulator, synchronization is needed for the mix_signal in the demodulator. Synchronization of the mix-signal between the modulator and demodulator is provided at startup, and synchronization can be maintained during operation. Optionally, synchronization can be reestablished during operation, such as after a long dead time in the data signal, or after a long continuous data signal. Synchronization circuitry 16 may be programmed into the FPGA 2 as illustrated, or they can be provided as fixed circuitry internal to an IC chip.

Figures 3, 4, 5:
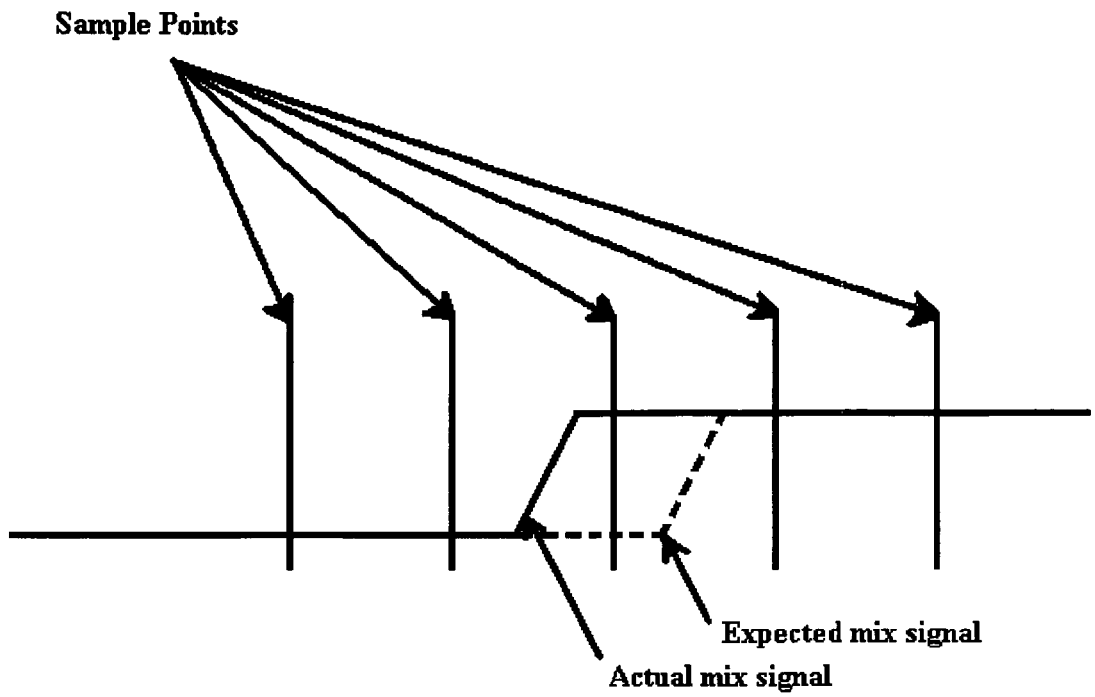
FIGS. 3-5 illustrate operation of the cleaner circuit of FIG. 1.

In one embodiment, a cleaner circuit 18 is provided at the output of the demodulator 14 in FIG. 1. The cleaner circuit 18 functions to eliminate sampling error by removing potentially erroneous data bits occurring due to transition of the input data signal around the mix signal edges. The cleaner circuit functions to eliminate bits on either side of the transition of the carrier signal. FIGS. 3-5 illustrate operation of the cleaner circuit 18.

FIG. 3 shows sample points between the mix signal transitions in the modulated input signal. As shown, the actual mix signal transition can occur prior to sampling due to interference when the input data signal transitions just prior to the mix signal transition. The expected mix signal is shown in dashed lines. FIG. 4 shows the data bits generated. With the expected mix signal not occurring, an error pulse is generated as indicated in FIG. 4, showing the difference between the sample data and the expected mix data.

FIG. 5 further shows expected mix data, along with possible error pulses to illustrate operation of the cleaner circuit. If the clean circuit does not detect a single bit error shift, "010" or "101" as shown in FIG. 5, in exactly the right location relative to the mix signal transition, it will not take any action. If enabled, the cleaner circuit 18, thus, cleans only single bits that are aligned exactly on the mix signal edge transitions. The circuit can remove all single bit pulses on either side of the expected mix edge.

The clean circuit operates at the cost of possibly missing some one-bit wide pulses. For example, in error pulse case two, a one-bit wide pulse that lined up exactly with the rising edge of the mix signal may have extended the mix signal. Again, it will not have any effect on wider pulses—it only removes solitary bits. The likelihood of an erroneous cleaning is a function of the mix period since there are four possible cleaned locations for each cycle of the mix signal. If using a 40-bit interface with a mix signal period of 20 word clocks, there is a four in 800 or 0.5% chance of missing a single bit pulse.

FIG. 6 illustrates inputs and outputs from an example of a circuit forming a combined synchronizer 16, demodulator 14, and carrier signal generator 15 from the FPGA of FIG. 1. FIG. 7 then provides a list describing the function of each input or output. The din[39:0] input illustrates a 40 bit parallel MGT output to the demodulator, while dout[39:0] illustrates a 40 bit parallel demodulator output. The clean_enable input enables the cleaner circuit to eliminate errors around the mix signal edges. The output mix_out provides the mix signal carrier, and mix_delay[4:0] is a four bit input for setting the period of the mix signal. A clock input to the circuit is provided by clk, and a circuit enable is provided by the enable input.

In FIG. 6, synchronization is provided using the rxslide_out, sync, and sync_err outputs, and the rst_n input. When the circuit is enabled and a reset signal (rst_n) is provided, the circuit goes through a synchronization cycle and tries to align the mix signal (mix_out) using the synchronization signal (rxslide_out) and its internal comparators. The input data signal is preferably continuously low during the synchronization process. Once the synchronization output (sync) is asserted, the circuit is synchronized and ready to use. It will continuously monitor and track the mix signal edges through a reasonable amount of drift without losing synchronization.

If synchronization is lost, the synchronization error signal (sync_err) is asserted and the circuit drops out of operation and re-acquires synchronization in the new position. For some applications, synchronization errors may be expected. In one embodiment, if the input data signal stream spans more than 32 mix signal periods, a sync error output will be asserted even though the circuit is operating normally.

Although the present invention has been described above with particularity, this was merely to teach one of ordinary skill in the art how to make and use the invention. Many additional modifications will fall within the scope of the invention, as that scope is defined by the following claims.

The invention claimed is:

1. A system comprising:
   an integrated circuit (IC) having an input terminal with AC coupling provided in the IC;
   a modulator provided external to the IC, the modulator having a first input for receiving a data signal, a second input for receiving a carrier signal, and having an output connected to the input terminal of the IC for providing a modulated form of the data signal; and
   a demodulator provided in the IC, the demodulator having a first input connected to the input terminal of the IC for receiving the modulated data signal, a first output providing the carrier signal connected to the second input of the modulator, and a second output providing a demodulated form of the data signal.

2. The system of claim 1, wherein the IC comprises an FPGA and the demodulator is programmed into logic of the FPGA.

3. The system of claim 1, wherein the input terminal of the IC is connected by a multi-gigabit transceiver to the demodulator.

4. The system of claim 1, wherein the modulator comprises an exclusive OR gate.

5. The system of claim 1, wherein the demodulator comprises a circuit for digitally canceling transitions of the modulated signal that correspond with transitions of the carrier.

6. The system of claim 1 wherein the AC coupling comprises a capacitor connected to the input terminal of the IC.

7. The system of claim 1, wherein the IC comprises a programmable logic device (PLD) and the demodulator is programmed into logic of the PLD.

8. The system of claim 1, further comprising a cleaner circuit connected to receive the demodulated data signal from the second output of the demodulator, the cleaner circuit removing data bits resulting from a signal transition that could have occurred during a transition of the carrier signal.

9. The system of claim 8, wherein the cleaner circuit removes data bits occurring on either side of a transition of the carrier signal.

10. The system of claim 1, further comprising a synchronization circuit, wherein the synchronization circuit resynchronizes the modulator and demodulator upon startup of the system.

11. The system of claim 10, wherein the synchronization circuit resynchronizes after a predetermined amount of time between transitions of the input data signal.

12. A method for providing DC balance to the input terminal of a Field Programmable Gate Array (FPGA) that has AC coupling on the input terminal, the method comprising:
   programming the FPGA to provide a demodulator circuit, the demodulator being connected to the input terminal for demodulating a modulated data signal received at the input terminal;
   providing a modulation circuit external to the FPGA, the modulating circuit for receiving a data signal and providing the modulating data signal to the input terminal of the FPGA; and
   programming the FPGA to provide a carrier signal, the carrier signal being provided to the demodulator circuit and through an output of the FPGA to the modulation circuit.

13. The method of claim 12, further comprising the step of:
   programming the FPGA to provide for cleaning the demodulated data signal by removing data bits resulting from a signal transition of the data signal that could have occurred during a transition of the carrier signal.

14. The method of claim 12, further comprising the step of:
   synchronizing the modulated data circuit with the modulated data signal.

15. The method of claim 14, further comprising the step of:
   resynchronizing the modulated data circuit with the modulated data signal after a predetermined time period where signal transitions do not occur in the data signal.

16. A system comprising:
   an integrated circuit (IC) having an input terminal with AC coupling provided in the IC;
   a mixing means for mixing a data signal with a mixing signal, the mixing means having an output providing a mixed data signal to the input terminal of the IC;
   a mixing signal cancellation means provided in the IC, the mixing signal cancellation means receiving the mixed data signal and canceling the mixing signal from the mixed data signal to provide the data signal to the IC; and
   mixing signal generator means provided in the IC, the mixing signal generator means providing the mixing signal to the mixing means.

17. The system of claim 16, wherein the mixing means comprises an XOR gate.

18. The system of claim 16, wherein the IC comprises an FPGA.

* * * * *